United States Patent [19]

Seko et al.

[11] 4,342,279

[45] Aug. 3, 1982

[54] DEVICE FOR DETECTING STEERING ANGLE AND DIRECTION

[75] Inventors: Yasutoshi Seko, Yokohama; Takayuki Yanagishima, Yokosuka, both of Japan

[73] Assignee: Nissan Motor Company, Limited, Yokohama, Japan

[21] Appl. No.: 177,995

[22] Filed: Aug. 14, 1980

[30] Foreign Application Priority Data

Aug. 28, 1979[JP] Japan ............... 54-118105[U]

[51] Int. Cl.³ .............................................. B60Q 1/42
[52] U.S. Cl. ................................................. 116/31
[58] Field of Search ........................................... 116/31

[56] References Cited

U.S. PATENT DOCUMENTS 2,707,451  5/1955  Brink ...................................... 116/31
2,934,035  4/1960  Hardy ..................................... 116/31
3,103,909  9/1963  Anderson ............................... 116/31

Primary Examiner—Robert I. Smith
Attorney, Agent, or Firm—Lane, Aitken, Kice & Kananen

[57] ABSTRACT

A device for detecting steering angle and steering direction of a steering wheel in an automotive vehicle, includes a pair of fixed contacts and a movable contact. The movable contact is arranged in connection with the fixed contacts in such a way that, when the steering wheel rotates in one direction, the movable contact engages only the first fixed contact, and when the steering wheel rotates in the opposite direction, the movable contact engages only the second fixed contact. Upon the basis of signals produced whenever the movable contact contacts one of the fixed contacts, the steering angle and steering direction are detected.

6 Claims, 15 Drawing Figures

FIG. IC
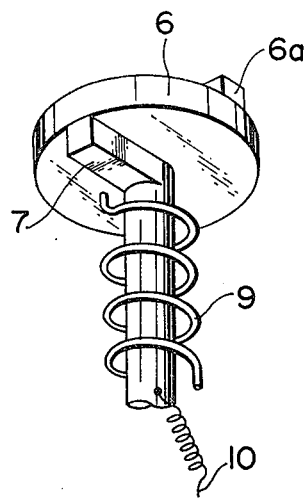
FIG. ID
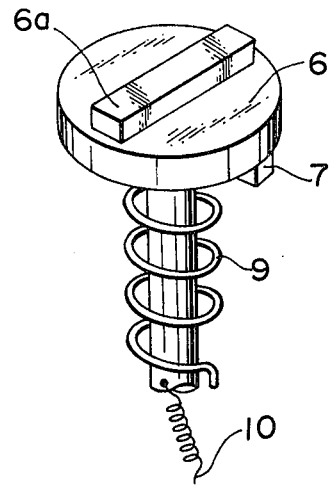
FIG. 2A
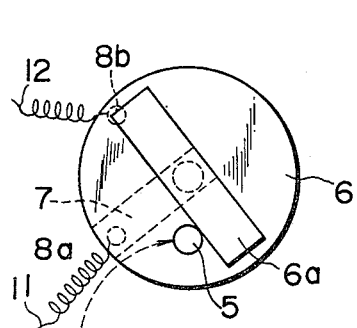
FIG. 2B
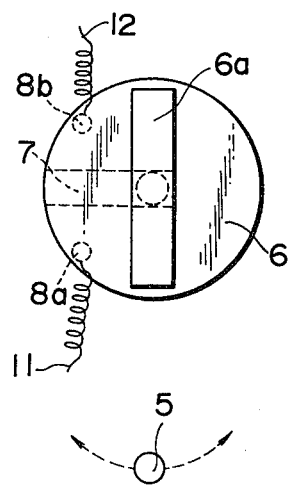
FIG. 2C
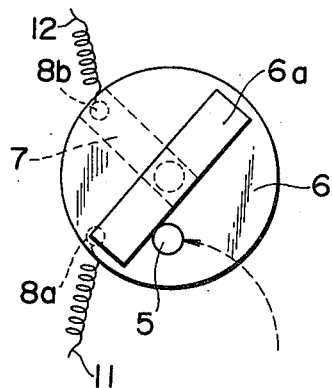

FIG. 3
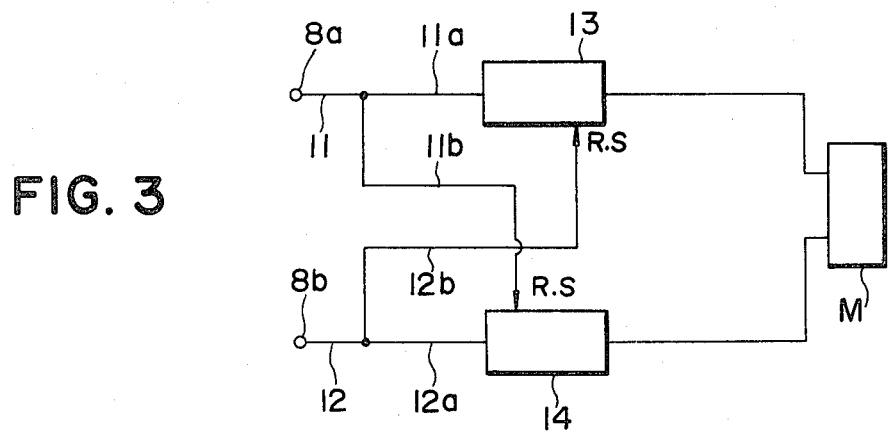
FIG. 4A
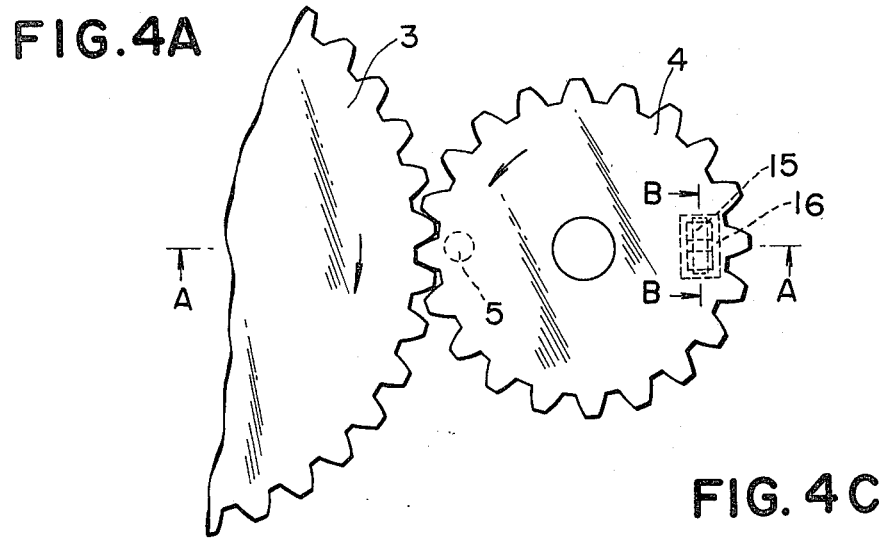
FIG. 4B
FIG. 4C
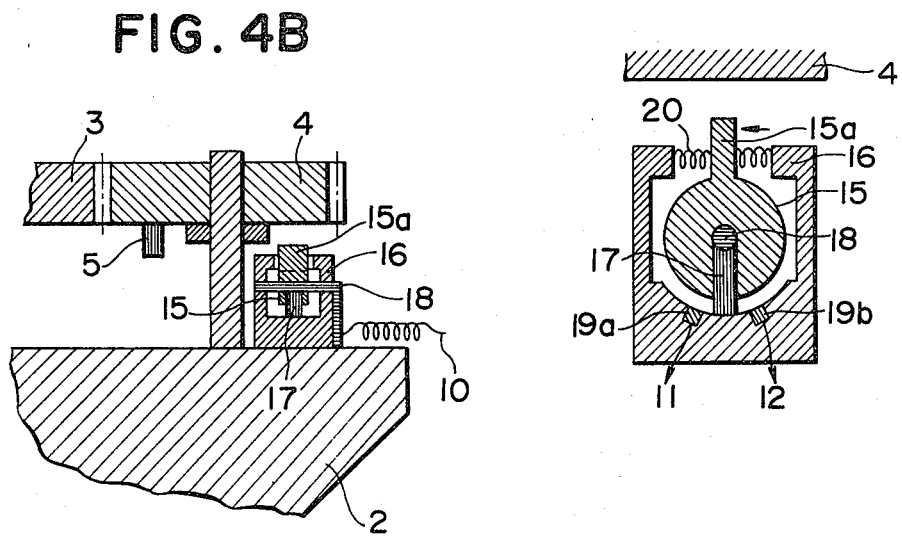

DEVICE FOR DETECTING STEERING ANGLE AND DIRECTION

BACKGROUND OF THE INVENTION

This invention relates to a device for detecting the rotation of a steering wheel of an automotive vehicle.

In a conventional device for detecting a steering angle, an analogue method is usually employed. If a digital method is employed, a special contact is provided for detecting a steering angle over a predetermined value. In this case, a mechanism for detecting a steering angle and direction at the same time is extremely complicated with a newly added steering mechanism. In addition, some modifications thereof are necessary.

SUMMARY OF THE INVENTION

It is an object of the present invention to provide a device for detecting the rotation of a steering wheel in which a steering angle and direction can be detected at the same time.

A further object of the present invention is to provide a device for detecting a steering angle and a steering direction at the same time, having a simple construction.

According to the present invention, a device for detecting a steering angle and steering direction comprises a pair of contacts fixed, for example, to a column tube or other member. Corresponding to those fixed contacts, a movable contact is provided in such a way that, when a steering wheel rotates in one direction, the movable contact engages only one of the two fixed contacts to produce a pulse signal, and when the steering wheel rotates in the other direction, the movable contact engages only the other of the two fixed contacts thereby to produce a pulse signal. Upon receipt of those signals produced as the result of the engagement of the movable contact with one of the two fixed contacts, an electrically detecting means is so designed as to detect the steering angle and the steering direction at the same time.

BRIEF DESCRIPTION OF THE DRAWINGS

These and other objects, features and advantages of the present invention will become more apparent from the following description of preferred embodiments thereof when read in conjunction with the accompanying drawings, in which:

FIGS. 1C and 1D are perspective views of a portion of the device shown in FIG. 1A;

FIGS. 2A through 2C show different operation modes of first and second members provided in the detecting device as shown in FIG. 1A;

FIG. 3 shows an electric circuit adapted to be applied to the detecting device shown in FIG. 1A;

FIG. 4A is a schematic plan view showing a second embodiment of the present invention;

FIG. 4B is a sectional view taken on the line A—A in FIG. 4A;

FIG. 4C is a sectional view taken along the line B—B in FIG. 4A;

DETAILED DESCRIPTION OF THE PREFERRED EMBODIMENTS

Figure 1A:
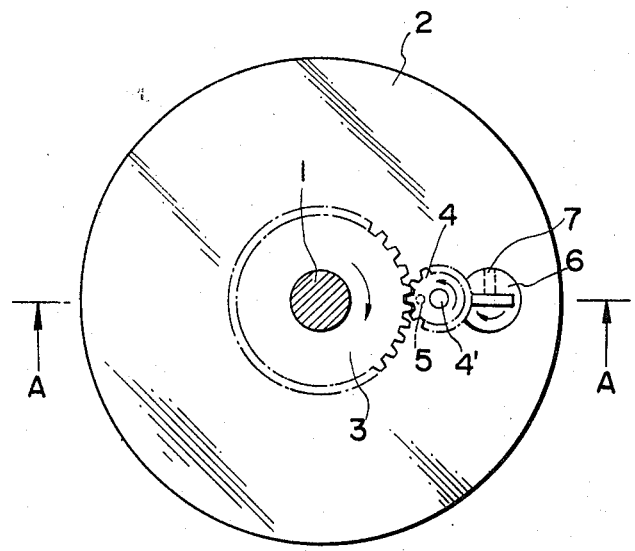
FIG. 1A is a schematic plan view showing a device for detecting the rotation of a steering wheel according to a first embodiment of the present invention.
Figure 1B:
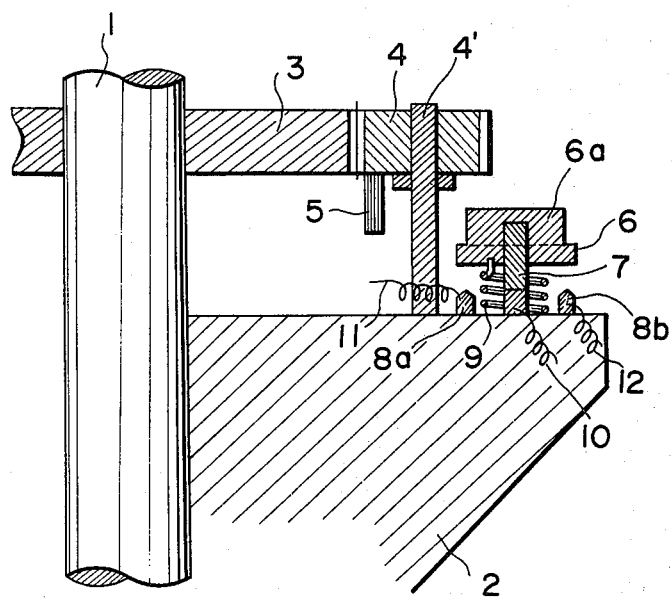
FIG. 1B is a sectional view taken along the line A—A in FIG. 1A.

Referring now to FIGS. 1 and 2, a first embodiment of the present invention is shown. A steering column shaft 1 for a vehicle body and a column tube 2 are provided in cooperation with each other. The construction and operations of the steering column shaft 1 and the column tube 2 are not stated in detail because those are well-known.

A first gear 3 is fixed at its center portion to the steering column shaft 1 so as to rotate together. A second gear 4 engages the first gear 3. The second gear 4 is rotatably supported by a shaft 4' fixed at its bottom end to the column tube 2. The gear ratio of the first gear 3 to the second gear 4 is preferably set at 3 to 1 so that, when the first gear 3 rotates once, the second gear 4 rotates three times. The second gear 4 has a first member 5 extending downwardly from the bottom of the second gear 4 and positioned near the periphery thereof. A second member 6 is preferably a circular plate having a strip-like projection 6a on the upper portion of the second member 6. The lower end of the first member 5 is positioned in such a way that, when the first member 5 moves horizontally by the rotation of the second gear 4, it can push the projection 6a together with the circular plate 6 so that the second member 6 can rotate within a predetermined angle. The second member 6 has a strip-like movable contact 7 on the lower side thereof adapted to contact one of a pair of a fixed contact 8a and a fixed contact 8b when the second member 6 rotates to a given position. Those fixed contacts 8a and 8b are provided on the top of the column tube 2. The second member 6 is biased by a coil spring 9 so as to be normally held in a neutral position as shown in FIG. 2B where the movable contact 7 is positioned between the fixed contacts 8a and 8b. The movable contact 7 is connected through a lead wire 10 to a power source (not shown). The fixed contacts 8a and 8b are connected through lead wires 11, 12 to an electric circuit, respectively.

In operation, when a steering wheel (not shown) rotates clockwise, the steering column shaft 1 rotates clockwise together with the first member 5 whereby the first member 5 comes into engagement with the projection 6a of the second member 6. Thus, the second member 6 is clockwise rotated by the pushing force of the first member 5 of the second gear 4 against the biasing force of the spring 9 so that the movable contact 7 thereof comes into engagement with the fixed contact 8b as shown in FIG. 2C. When the second gear 4 further rotates counter-clockwise, the projection 6a of the second member 6 is released from the first member 5 of the second gear 4. As a result, the second member 6 rotates to return back to its neutral position by the biasing force of the spring 9. On the other hand, when the steering wheel rotates counter-clockwise together with the first gear 3, so that the second gear 4 rotates clockwise together with the first member 5 whereby the first member 5 comes into engagement with the projection 6a of the second member 6. The clockwise movement of the first member 5 urges the second member 6 to rotate counter-clockwise so that the movable contact 7 of the second member 6 comes into engagement with the fixed contact 8a as shown in FIG. 2A. When the second gear 4 further rotates in the same direction, the projection 6a of the second member 6 is released from the first member 5 so that the second member 6 rotates to return back to its neutral position as shown in FIG. 2B.

When the movable contact 7 engages any one of the fixed contacts 8a and 8b, a signal is sent to an electric circuit for detecting the rotation of the steering wheel.

FIG. 3 briefly shows an example of such an electric circuit. A first counter 13 is connected through the lead wires 11a and 11 to the fixed contact 8a and through the lead wires 12b and 12 to the contact 8b. A second counter 14 is connected through the lead wires 12a and 12 to the fixed contact 8b and through the lead wires 11b and 11 to the contact 8a. The second counter 14 counts a number representing the clockwise rotation of the second member 6 upon receipt of signals from the lead wire 12 when the steering wheel is clockwise rotated. When the steering wheel begins to rotate in the opposite direction, i.e., counter-clockwise, the second counter 14 is reset upon receipt of a signal from the lead wire 11. The first counter 13 counts a number representing the counter-clockwise rotation of the second member 6 upon receipt of signals from the lead wire 11 when the steering wheel is counter-clockwise rotated. When the steering wheel begins to rotate clockwise, the counter 13 is reset upon receipt of a signal from the lead wire 12.

Accordingly, the count number of the counters 13, 14 increases in direct proportion to the steering angle in one rotation direction until the steering wheel begins to rotate in the opposite direction. At the same time, the steering direction of the steering wheel can be determined by detecting which one of the counters 13 and 14 is counting the rotation of the second member 6. The steering angle detected is indicated digitally in an indicator M together with the steering direction. An alarm device can be used in place of the indicator M.

FIGS. 4A to 4C show a second embodiment of the present invention. The construction and operation of the first and second gears 3, 4 and the first member 5 are substantially the same as those of the first embodiment. A mechanism for detecting the rotation of the second gear 4 is modified. A cover member 16 is fixed to the column tube 2, for example. A second member 15 is rotatably supported by a pin 18 horizontally secured in the cover member 16. The second member 15 has a projection 15a extending upwardly from the top thereof and is biased by a spring 20 so as to be maintained normally in a neutral position as shown in FIG. 4C. The first member 5 and the projection 15a of the second member 15 are so arranged that the lower portion of the first member 5 can engage and push the upper portion of the projection 15a when the second gear 4 rotates. The second member 15 has also a movable contact 17 fixed in the lower portion thereof which can engage one of a pair of fixed contacts 19a and 19b when the second member 15 rotates within a predetermined angle. The movable contact 17 is connected through the pin 18 and the lead wire 10 to a power source (not shown). The fixed contacts 19a and 19b are connected through their respective lead wires 11, 12 to an electric circuit in the same manner as in the first embodiment.

In operation, when the steering wheel rotates clockwise, the steering column shaft 1 and the first gear 3 rotate in the same direction, and the second gear 4 rotates counter-clockwise. When the first member 5 engages the projection 15a of the first member 15, the latter is pushed to rotate counter-clockwise while the movable contact 17 engages the fixed contact 19b. When the first member 5 has gone beyond the projection 15a, the projection 15a returns back to its neutral position by the biasing force of the spring 20. On the other hand, when the steering wheel rotates counter-clockwise, the steering column shaft 1 and the first gear 3 rotates in the same direction, and the second gear 4 rotates clockwise. When the first member 5 engages the projection 15a of the first member 15, the latter is pushed to rotate clockwise so that the movable contact 17 engages the fixed contact 19a. After the first member has passed beyond the projection 15a of the first member 15, it returns back to its neutral position by means of the spring 20. Pulse signals are sent to a suitable electric circuit for detecting the rotation of the second gear 4 in the same manner as in the first embodiment.

Figure 5A:
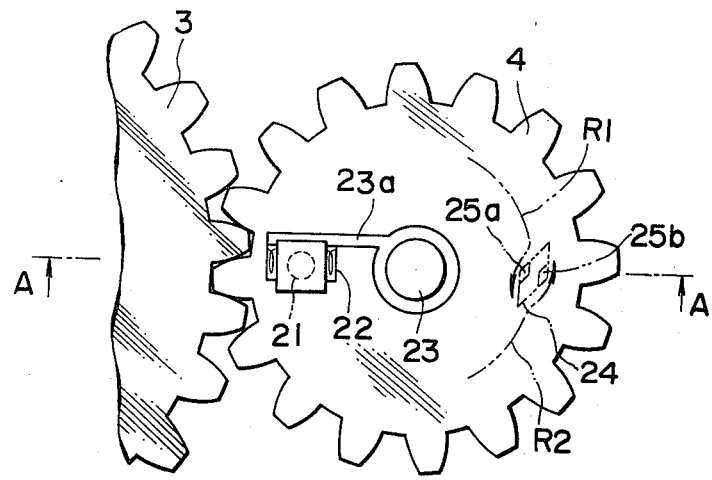
FIG. 5A is a plan view showing a third embodiment of the present invention.
Figure 5B:
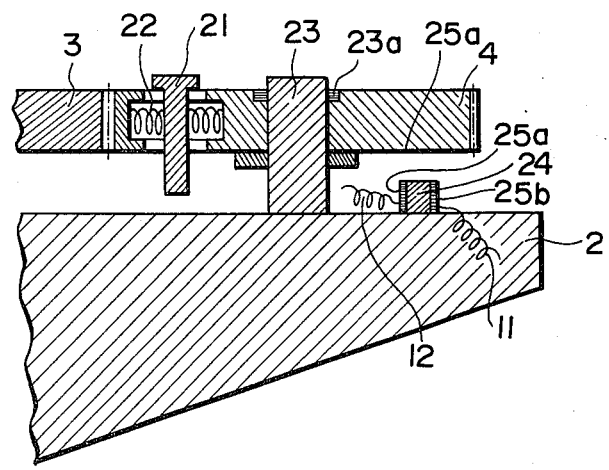
FIG. 5B is a sectional view taken along the line A—A in FIG. 5A.

FIGS. 5A and 5B show a third embodiment of the present invention. The steering column shaft 1 and the first gear 3 are substantially the same as in the first embodiment. The second gear 4 engaging the first gear 3 is a non-conductor and has a space formed therein in which a movable contact 21 in a pin shape is placed normally in a neutral position by the biasing force of a spring 22. Also, the second gear 4 is rotatably supported by a pin 23 which is made of a conductive material. A conductor 23a electrically connects the pin 23 with the movable contact 21 through the spring 22. A projection 24 is fixed on the column tube 2 and has a pair of fixed contacts 25a and 25b. The projection 24 is so formed and arranged that the movable contact 21 can engage only the inside of the projection 24 when the second gear 4 rotates clockwise as shown by the chain line $R_1$ in FIG. 5A and it can engage only the outside thereof when the second gear 4 rotates counter-clockwise as shown by the chain line $R_2$. The fixed contact 25a is placed on the inside of the projection 24 and connected with the lead wire 12. The fixed contact 25b is placed on the outside of the projection 24 and connected with the lead wire 11.

In operation, when the steering wheel rotates clockwise, the second gear 4 and the movable contact 21 rotate counter-clockwise so that the movable contact 21 engages the fixed contact 25b on the outside of the projection 24 whereby the lead wire 10 is electrically connected through the pin 23, the contact 23a, the spring 22, the contact 21 and the contact 25b to the lead wire 11 thereby to produce a pulse signal. On the other hand, when the steering wheel is counter-clockwise rotated, the movable contact 21 engages the fixed contact 25a so that the lead wire 10 is electrically connected to the lead wire 12 thereby to produce a pulse signal. Thus, the steering angle and direction can be simultaneously detected in the same manner as in the first embodiment.

Figure 6A:
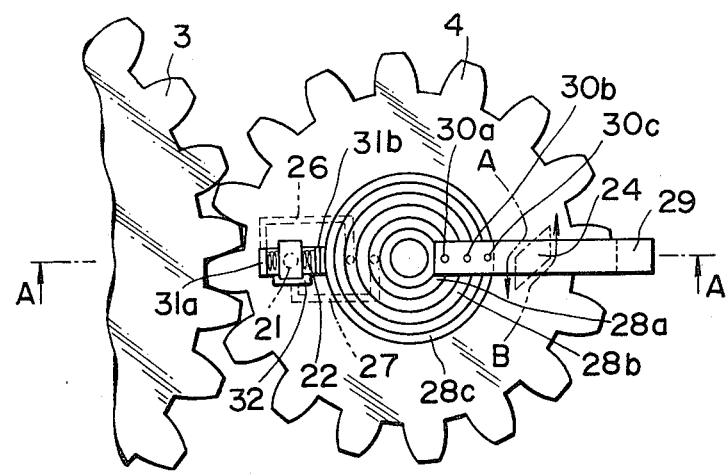
FIG. 6A is a plan view showing a fourth embodiment of the present invention.
Figure 6B:
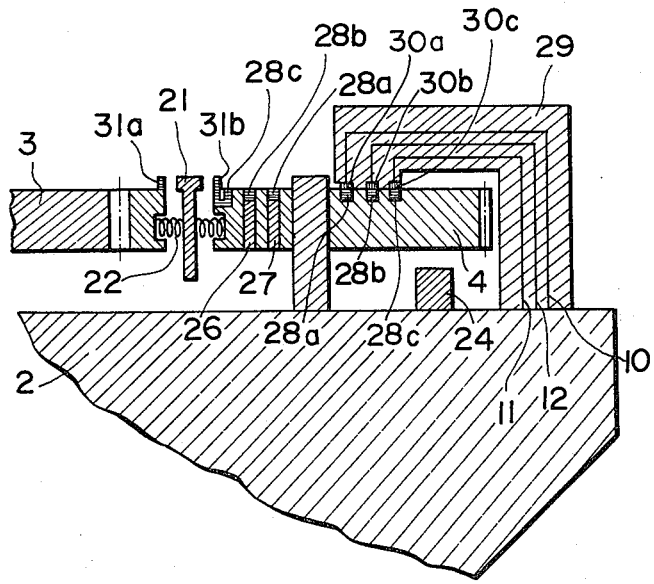
FIG. 6B is a sectional view taken along the line A—A in FIG. 6A.

FIGS. 6A and 6B show a fourth embodiment of the present invention which is a modification of the third embodiment shown in FIGS. 5A and 5B. The first gear 3 fixed to the column shaft 1 meshes with the second gear 4. The movable contact 21 is held normally in a neutral position by the biasing force of the spring 22. The projection 24 is fixed on the top of the column tube 2 and so formed and arranged that the movable contact 21 can engage only the inside of the projection 24 when the second gear 4 rotates clockwise as shown by the chain line A and it can engage only the outside thereof when the second gear 4 rotates counter-clockwise as shown by the chain line B. Three circular contacts 28a, 28b, 28c are concentrically provided on the upper portion of the second gear 4. A pair of contacts 31a and 31b are placed at the opposite sides in the radial direction of the second gear 4 along which the movable contact 21 moves against the force of the spring 2 when it engages the projection 24. The contact 31a is connected through a conductor 26 to the circular contact 28b. The movable contact 21 is connected through a conductor 27 and a contact 32 to the circular contact 28a. The contact 31b is directly connected to the circular contact 28c as best shown in FIG. 6B. An L-like arm 29 is fixed at its bottom to the column tube 2 and set at its tip near the upper surface of the second gear 4 where the three circular contacts 28a, 28b, 28c are positioned. Three contacts 30a, 30b, 30c are fixed on the tip of the arm 29 in such a way that they can engage the circular contacts 29a, 29b, 29c, respectively. The contacts 30a, 30b, 30c are connected to the lead wires 10, 11, 12, respectively. Those lead wires 10, 11, 12 can be connected to the electric circuit as shown in FIG. 3, for example.

In operation, when the steering wheel rotates clockwise, the second gear 4 and the movable contact 21 rotates counter-clockwise so that the lower portion of the movable contact 21 engages the outside of the projection 24. As a result, the top of the movable contact 21 engages the circular contact 31a so as to connect the lead wire 10 with the lead wire 11 by way of the contact 30a, the contact 28a, the conductor 27, the contact 32, the movable contact 21, the contact 31a, the conductor 26, the circular contact 28b and the contact 30b thereby to produce a pulse signal. On the other hand, when the steering wheel rotates counter-clockwise, the second gear 4 and the contact 21 rotates clockwise so that the lower portion of the movable contact 21 engages the inside of the projection 24. As a result, the top of the movable contact 21 engages the circular contact 31b so as to connect the lead wire 10 with the lead wire 12 by way of the contact 30a, the contact 28b, the conductor 27, the contact 32, the movable contact 21, the contact 31b, the circular contact 28c and the contact 30c thereby to produce a pulse signal. Accordingly, the steering angle can be indicated digitally together with the steering direction in the same manner as in the first embodiment.

Although in the fourth embodiment the contacts 30a, 30b, 30c are in sliding contact with the circular contacts 28a, 28b, 28c, a non-contact type detecting structure can be employed, for example, by means of a photodiode, magnet, phototransistor, or magnetic responsive element.

As can be seen from the foregoing, according to the present invention, a device for detecting the rotation of the steering wheel is simple in construction. Only a few simple contacts or the like are provided to detect both the steering angle and the steering direction at the same time. Also, a condition of a driver's dozing off at the wheel can be detected by using a detecting device according to the present invention. When the driver dozes off at the wheel, the steering angle unusually increases over a predetermined value, which can detected by a device according to the present invention. During a normal drive, the counts of the second gear's rotation in the both directions are balanced to be zero totally. If the driver dozes off, however, the rotation counts of the second gear are not balanced.

What is claimed is:

1. A device for detecting a steering angle and steering direction of an automotive vehicle, comprising:
   (a) a steering wheel;
   (b) a steering column shaft connected to the steering wheel;
   (c) a first gear fixed to the steering column shaft so that the first gear rotates together with the steering column shaft in the same direction;
   (d) a second gear which is driven by the first gear in such a way that when the first gear rotates in one direction the second gear rotates in the opposite direction;
   the improvement comprising:
   (e) a pair of first and second fixed contacts fixed relative to the automotive vehicle;
   (f) signal producing means including a movable contact formed and arranged in such a manner that, when the steering wheel rotates in one direction, the movable contact engages only the first fixed contact to produce a pulse signal, and when the steering wheel rotates in the opposite direction, the movable contact engages only the second fixed contact to produce a pulse signal; and
   (g) means for electrically detecting the rotation number of the second gear and the rotation direction thereof on the basis of the pulse signals produced so that the steering angle and the steering direction of the steering wheel can be detected.

2. The device of claim 1, wherein said signal producing means further comprises a first member extending downwardly from the lower side of the second gear, and a second member rotatable relative to the automotive vehicle, said second member including a projection integrally fixed on the upper side of the second member for engaging the first member of the second gear when the second gear rotates so that the second member can be actuated to rotate, and wherein the movable contact is fixed on the lower side of the second member.

3. The device of claim 2 wherein said signal producing means further comprises a spring for holding the second member normally in its neutral position by the biasing force thereof where the movable contact is positioned between the pair of first and second fixed contacts so that the movable contact may engage the first fixed contact only when the second gear rotates in one direction or engage the second fixed contact only when the second gear rotates in the opposite direction whereby the steering angle and the steering direction can be detected.

4. The device of claim 1, wherein said signal producing means further comprises a first member extending downwardly from the lower side of the second gear, a cover member fixed relative to the automotive vehicle, the first and second fixed contacts being placed in position onto the cover member, and a second member rotatably provided to the cover member, the second member having a projection integrally formed on the upper side thereof for engaging the first member of the second gear when the second gear rotates, and wherein the movable contact is fixed onto the lower side of the second member in such a way that, when the second gear rotates in one direction, the movable contact engages the second fixed contact in the opposite direction.

5. The device of claim 1, wherein the second gear has a hole formed vertically therein in which the movable contact is placed, and said signal producing means further comprises a second member fixed relative to the automotive vehicle, the second member having the first and second fixed contacts on the inside and outside thereof, respectively, in such a way that, when the second gear rotates in one direction, the movable contact may engage only the first fixed contact on the inside of the second member, and when the second gear rotates in the opposite direction, the movable contact may engage only the second fixed contact on the outside of the second member.

6. The device of claim 1, wherein the second gear has a hole vertically formed therein in which the movable contact is placed, the first and second fixed contacts being arranged at the opposite sides of the edge of the hole, and said signal producing means further comprises a second member fixed relative to the automotive vehicle in such a way that, when the second gear rotates in one direction, the movable contact may engage only the first contact, and when the second gear rotates in the opposite direction, the movable contact may engage only the second fixed contact.

* * * * *